2,880,081

HONING STONE AND METHOD OF MAKING

William R. Eubank, Troy Township,
St. Croix County, Wis.

No Drawing. Application September 3, 1953
Serial No. 378,423

6 Claims. (Cl. 51—308)

This invention relates to novel methods for the manufacture of honing stones such as are employed in the shaping and finishing of metal cylinders and plates, ceramic and glass articles, etc., and other related structures; to the novel compositions employed therein; and to the improved products produced thereby.

One particular type of hone commonly employed in grinding and polishing the interior wall surfaces of cylinders consists of a rotating and slowly reciprocating head fitted with four or more abrasive sticks or honing stones. These stones parallel the axis of the head and are mechanically pressed against the interior surface of the cylinder under controlled pressure. A typical head employed in honing a cylinder having a length of 3 feet and an inside diameter of 4⅛ inches carries 6 such stones each $7/_{16}$ x ⅜ x 4 inches, the narrow face being thrust against the cylinder wall.

Prior art honing stones have been made by compacting, drying, and firing a mixture of abrasive grit, a temporary organic binder, a permanent vitreous binder in powder form, and a volatile solvent for the organic binder. The compacted mixture is dried, and while still in the green or unfired state is cut and shaped into segments of the required dimensions which are then fired at high temperatures to activate the vitreous bond. Such stones frequently break or shatter when used at high pressures or on rough surfaces or with insufficient care. They are erratic in performance, due to non-uniformity in hardness and structure. The stones are altered in structure and in dimensions on firing.

Objects of this invention therefore include: the provision of methods for making honing stones and analogous articles of improved strength, hardness, toughness and uniformity, and of accurate dimensions; the provision of compositions capable of being formed into strong, tough, hard, uniform honing stones or the like; the provision of compacted unfired blanks suitable for conversion to honing stones or the like, having high green strength and good machinability, and which on firing remain substantially unaltered in dimensions; and the provision of fired honing stones and other artificial stone-like structures having improved strength, hardness, toughness, uniformity, free-cutting properties, and durability.

These and other objects and advantages are attained in accordance with the principles of the present invention by employing the compositions herein disclosed in the manner here described, most particularly by employing certain water-soluble inorganic bonding agents either alone or in conjunction with other bonding agents for the abrasive grits or particles, by forming therewith a granular and free-flowing but pressure-coherent mixture, by compacting such mixture to the degree necessary to obtain the desired porosity, by drying the compacted article to form a blank of surprisingly high green strength, and by then firing the blank or a desired portion thereof to the final full degree of strength with substantially no change in the dimensions of the piece.

In one exemplary but non-limitative procedure, 24 parts by weight of Grit 400 aluminous oxide abrasive grain is first uniformly moistened with 1½ parts of an aqueous 50% solution of monoaluminum phosphate $Al(H_2PO_4)_3$, and to this mixture is added a pre-formed mixture of 4½ parts of powdered frit and 1½ parts of ball clay. Frit No. 3225, a powdered soda-lime-borosilicate glass product of The Ferro Corporation, is suitable; it, together with the clay, forms a vitreous bond when heated at about 2000° F. The ingredients are thoroughly mixed in a dough-mixer and may then be passed through a coarse screen to break up any large lumps. The resulting product is dry-appearing, free-flowing and granular, but can be cohered together into a unitary mass under pressure.

The granular mixture is next placed in a mold and pressed together under high pressure to produce a preform, which is dried to substantially constant weight at about 300° F., cut and shaped into segments of the desired size, and fired at about 2000° F.

In a comparative test of grinding characteristics, honing stones made in accordance with the above-described method and formula but using Grit 150 abrasive were tested against commercially available stones of the same grit size made by prior art methods, by measuring the amount of stock removed in a honing operation as described in the second paragraph of this specification. Under identical test conditions, the depth of cut accomplished in the 4⅛" I.D. x 3 ft. cylinder per mil of hone wear was as follows:

| | Mils |
|---|---|
| Hones of this invention | 0.74 |
| Commercial hone A | 0.44 |
| Commercial hone B | 0.32 |

The dried but unfired blank is surprisingly strong and tough, requiring the use of abrasive cut-off wheels or the like for cutting and shaping the segments. Hence the green product can be roughly handled in factory operations without loss. A further advantage is that this strength is maintained throughout the subsequent firing operation, since the inorganic binder remains associated with the abrasive particles and does not decompose or volatilize before the frit and clay are activated. This factor is also of importance in obtaining unusually good bonding properties between the abrasive particles and the final vitreous bond.

The substitution of non-voltatile inorganic binder material for some or all of the volatile organic materials is particularly advantageous in the case of the finer abrasive grits such as are used in finishing-stones. Fine-grit compositions in particular, when made with organic temporary binders in accordance with prior art practice, are frequently found to cause structural weakening of stones made therefrom, either because of rapid removal of volatiles, or lack of bonding action at high temperatures prior to activation of the frit and clay, or for some other reason. No such weakening is encountered in using the novel compositions of the present invention.

The porosity as well as the strength and hardness of the final honing stones may be controlled in a number of ways; one effective method is by control of the degree of compression. In one example, using the specific mixture hereinabove described, varying amounts of the mixture were compressed within a circular mold to a circular disc 10½ inches in diameter and 1.55 inches thick, and segments of the dried disc were fired and tested for hardness by means of the Wilson-Rockwell hardness tester, employing a diamond point at a loading of 60 kgs.

| Weight of mixture: | Rockwell A hardness value |
|---|---|
| 8 lbs. 10 oz | 83 |
| 8 lbs. 13 oz | 95 |
| 9 lbs. 0 oz | 106 |

Measurements of the porosity of the segments were made by determining the volume of melted sulfur taken up by segments of known dimensions. The porosity of the stones decreased as the weight of mixture employed was increased.

The specific formula given hereinabove is equally effective with other grit sizes from Grit 600 or finer up to at least about Grit 80, and with other abrasive grits when substituted on an approximate volume basis. Silicon carbide, for example, requires only about 4.8 parts of the frit-clay mixture rather than 6 parts as indicated in the formula to produce a stone of equivalent grade, although the amount of aluminum phosphate solution would not ordinarily be decreased to a like extent.

The frit and clay unite to form a strong permanent vitreous bond when the stones are fired. It is believed that the aluminum phosphate also enters into the combination, although this does not appear to be essential. However the aluminum phosphate undoubtedly improves the rate and degree of bonding between the frit and clay blend and the abrasive grains, as previously indicated. Other finely powdered frits, or modified or unmodified alkali earth silicates such as feldspars, etc., and other plastic clays such as bentonite or EPK china clay, may be substituted for the specific components of the principal formula. The combination of frit and plastic clay provides desirably low fusion point and high fluidity at high temperatures with effective plasticity in the presence of water in the initial mix.

Surprisingly, it is also possible to produce excellent honing stones and similar shaped articles in the absence of clay and frit or equivalent high-temperature vitreous bond. As an example, a composition of 30 parts by weight of Grit 500 aluminous oxide abrasive grain and about 3–5 parts of the aqueous 50% solution of aluminum phosphate as used in the previous example produced compacted shapes having excellent green strength as well as high strength and toughness in the fired form. Reducing the amount of solution to 2½ parts reduced the strength of the undried compressed blank to a point at which it was difficult to remove from the mold, although the green strength after drying was adequate for most purposes. The wet strength was improved by substituting an equal weight of 60% phosphate solution in place of the 50% solution above specified. At 10 parts of the 50% solution, the mixture was not readily free-flowing but tended to stick in the mixer and on the screen. The dried but unfired segments were so strong that they were difficult to cut and fabricate in the usual manner.

Organic binders such as gums and resins are not effective by themselves in preventing dimensional changes on firing and in providing the desired uniformity of properties, as already indicated. Surprisingly, rather large proportions of such binders may advantageously be added to compositions based on my inorganic binders while still maintaining a high degree of dimensional stability, strength and uniformity. In one such formulation, a combination of 25 lbs. 4 oz. of Grit 150 aluminous oxide, 3 lbs. 9 oz. of powdered frit, 1 lb. 3 oz. of ball clay, 12 oz. of the aqueous 50% aluminum phosphate solution, and 12 oz. of a 50% solution in isopropyl alcohol of heat-setting phenol-formaldehyde resin, mixed together as previously described, formed compacted structures having high green strength and showing substantially no dimensional changes on firing. Similar results were obtained with a composition consisting of 26 lbs. 14 oz. of Grit 400 silicon carbide, 2 lbs. 6 oz. of powdered frit, 12 oz. of ball clay, 12 oz. of inorganic binder solution, and 1 lb. 2 oz. of an aqueous 40% solution of dextrin. In this example an aqueous 34% sodium silicate solution, having a $Na_2O:SiO_2$ ratio of about 1:3.22, served as the inorganic binder. The combination of silicate and dextrin, together with the other components, produced a compacted mass having high wet strength, high green strength, high dimensional stability, and high strength and toughness after firing. Silicate and dextrin could also be effectively employed in the absence of the clay and frit to produce machinable green segments which on firing were strong and tough. However the silicate alone, unlike the phosphate binder, was ineffective in providing structures of high green strength even though the dimensional stability and ultimate strength of such structures after firing was high.

Another inorganic bonding agent which in compositions similar to those employed with the aluminum phosphate and sodium silicate binders has provided honing stones of excellent strength characteristics both in the green and in the fired state is alumina hydrosol. This material is prepared by decomposing a concentrated aqueous aluminum acetate solution by gentle boiling until no further evolution of acetic acid can be detected, and by adding to the resulting slurry a trace of trichloroacetic acid with violent agitation. A small amount of methyl cellulose may also be added as a protective colloid. A typical dispersion contained 40% solids and had a pH value of 5–6. Stones made with this binder are subject to some warping or other dimensional changes on firing, but are nonetheless comparatively high in strength.

The following table indicates the results obtained with these several formulas in terms of breaking strength of test bars, and as compared with similar bars employing an organic temporary binder. Bars ⅜ x ⅜ x 4 inches were placed across parallel knive-edges spaced 3.5 inches apart and were broken by pressing a third knife-edge down on the bar at the central point between the two supports, the load in pounds required to break the bar being recorded as a measure of bar strength. In all cases the same ratio of abrasive grit, clay-frit mixture, and inorganic binder was maintained, and the inorganic binder was added with just sufficient volatile vehicle to form a granular free-flowing pressure-coherent mass.

| Temporary binder | Bar strength, lbs. | |
|---|---|---|
| | green | fired |
| Phenolic resin (control) | 19 | 25–70 |
| Monoaluminum phosphate | 24 | 120 (110–130) |
| Sodium silicate | 12 | 114 (105–125) |
| Alumina hydrosol | 17 | 86 (80–90) |

It will be seen in the above table that each of the inorganic temporary binders produced bars having a fired strength substantially higher than was obtainable with the phenolic resin organic temporary binder. Furthermore the values obtained with the phenolic resin product were extremely variable, whereas the values obtained with the inorganic binders were much more uniform. In green strength, only the aluminum phosphate binder exceeded the phenolic resin, and the test bars made with sodium silicate were about as low in green strength as is consistent with machinability; however it has already been shown that the green strength of such compositions may be substantially improved by the addition of organic binders without interfering with the attainment of high strength on firing.

The amount of aqueous inorganic binder solution to be added to the abrasive grain varies with the grit size of the grain and, to a lesser extent, with the relative amount of clay and frit or other materials added. The correct amount of binder is that quantity which provides a granular and free-flowing but still pressure-coherent mass. It can be conveniently determined both by handling of the mixture and by passing the mixture through a coarse screen of 20–30 mesh. Assuming that adequate mixing of the batch has been accomplished, the addition of the proper amount of liquid to the abrasive grain produces a greasy or damp condition in the powdery mixture, which prior to that point is dry and fluffy in character. The powder passes through the screen cleanly without wetting the wires; this characteristic also provides a means for determining whether or not the degree of mixing is adequate. Addition of further quantities of liquid then rapidly changes the mass to a sticky or muddy, wet product which sticks in the screen. In general, 24 pounds of Grits 80–100 aluminous oxide requires about 12 ounces of the aqueous 50% aluminum phosphate solution or equivalent amounts of sodium silicate solution or alumina hydrosol suspension. Grits 120–180 require about one to 1¼ lbs. of the phosphate solution per 24 lbs. of grit; Grits 220–400, about 1¼ to 1½ lbs.; and Grits 400–600, about 1½–2 lbs. of solution per 24 lbs. of grit.

The proportion of grit to solid binder may be varied within wide limits depending on the type of operations for which the stones are designed, the grit size, and other factors. Mixtures of 10 parts of Grit 80 aluminous oxide or even somewhat coarser abrasive particles with 20 parts of a mixture of frit and ball clay in the ratio of 4.5:1.5, and with 2 parts of aqueous 50% aluminum phosphate solution, provides an extremely hard and tough stone, applicable in severe abrading operations and capable of withstanding severe mechanical shock. Mixtures of 28 parts of Grit 500–600 with 2 parts of the clay-frit mixture and 1½–2 parts of the phosphate solution on the other hand provide soft stones which wear away rather rapidly and are therefore most useful in super-finishing operations under light operating pressures. A mixture of 27¼ parts of Grit 150 or finer abrasive grain with 3¾ parts of the clay-frit mixture and about 1¼ parts of the phosphate solution provides a generally useful product having good strength and toughness; similar properties are obtained with the 24–6–1½ ratio of the first example herein presented.

In making honing stones or other articles in accordance with the principles here set forth, it will be apparent that the stones may either be cut from a larger compacted blank, or alternatively may be compacted to size in specially prepared molds.

Where monoaluminum phosphate has been specified as the inorganic binder, aluminum phosphate products having somewhat more than the indicated aluminum content may also be used. Likewise the soda-silica ratio of effective sodium silicate binders may vary somewhat from the specific ratio indicated.

The concentration of the inorganic binders may also be varied substantially from that indicated in the foregoing examples. The amount of solid binder added in this way must in all cases be sufficient to provide the desired green strength, but may be much greater than this amount, and may in fact constitute the entire binder constituent, as has been shown hereinbefore. The amount of water must be sufficient so that the binder wets and coats the entire surface of the abrasive particles, but must not be so great as to produce a sticky or muddy consistency. Furthermore the concentration of the binder solution is limited by the solubility of the solid component and the viscosity of the solution. In general, where the aluminum phosphate type of binder is concerned, at least about 6 ounces of the solid phosphate is required for each 24 lbs. of aluminous oxide grit or equivalent amount of other abrasive grit, and this amount is added in the form of an aqueous solution containing about 30–60% of the phosphate.

Although the invention is primarily concerned with honing stones prepared with fine grades of abrasive grain, it will be apparent that the same techniques and formulas may be applied to many other fields where high green strength, machinability, dimensional stability, and final strength are desired. For example, magnesium silicate, fibrous talc, steatites, etc. may be mixed with the aqueous inorganic bonding agents hereinabove identified, with or without the addition of clay, frit, and other additives, and the mass compacted in suitable molds or forms to produce coil forms, resistor cores, laboratory stoneware, and various other articles having high green strength and machinability when dried and high ultimate strength when fired. Talc and other powders of similar nature are not ordinarily considered as abrasive particles. However they provide much the same results, in terms of structure of the finished product, as do the true abrasive particles such as aluminous oxide and silicon carbide, and hence for purposes of this invention may be classified with the latter materials.

I claim:
1. An unfired artificial stone-like structure having high green strength and capable of being machined into accurately dimensioned segments and of being fired without substantial dimensional change, said structure being a hard pressure-compacted and dried mass of a granular coherent mixture of components comprising fine mineral particles and concentrated liquid aqueous aluminum dihydrogen phosphate inorganic binder solution.

2. An unfired artificial stone-like structure having high green strength and capable of being machined into accurately dimensioned segments and of being fired without substantial dimensional change, said structure being a hard pressure-compacted and dried mass of a granular coherent mixture of components consisting essentially of fine abrasive grain and concentrated liquid aqueous aluminum dihydrogen phosphate inorganic binder solution.

3. An artificial stone-like structure having high strength and a high degree of uniformity and being the vitreous fired residue of a pressure-compacted and dried mass of a granular coherent mixture of components comprising fine mineral particles and concentrated liquid aqueous aluminum dihydrogen phosphate inorganic binder solution.

4. An artificial stone-like structure having high strength and a high degree of uniformity and being the vitreous fired residue of a pressure-compacted and dried mass of a granular coherent mixture of components consisting essentially of fine abrasive grain and concentrated liquid aqueous aluminum dihydrogen phosphate inorganic binder solution.

5. An artificial stone-like structure having high strength and a high degree of uniformity and being the vitreous fired residue of a pressure-compacted and dried mass of a granular coherent mixture of components consisting essentially of fine abrasive grain, concentrated liquid aqueous aluminum dihydrogen phosphate inorganic binder solution, powdered glassy silicate, and plastic clay.

6. The method of making an accurately dimensioned honing-stone which comprises mixing together components including fine abrasive grain and concentrated liquid aqueous aluminum dihydrogen phosphate inorganic binder solution to form a granular coherent pre-mix, pressure-compacting said pre-mix into a coherent unitary block of desired density, drying said block to develop high green strength, machining said block to form a piece having the desired dimensions, and firing said piece to provide a vitreously bonded honing stone of substantially said desired dimensions.

References Cited in the file of this patent
UNITED STATES PATENTS

| Number | Name | Date |
| --- | --- | --- |
| 1,987,861 | Milligan et al. | Jan. 15, 1935 |
| 2,000,611 | Prange | May 7, 1935 |
| 2,356,938 | Lombard | Aug. 29, 1944 |
| 2,527,044 | Walton et al. | Oct. 24, 1950 |
| 2,541,658 | Masin et al. | Feb. 13, 1951 |
| 2,559,664 | Ries et al. | July 10, 1951 |